(12) United States Patent
Huo et al.

(10) Patent No.: US 12,417,297 B2
(45) Date of Patent: Sep. 16, 2025

(54) SECURING SENSITIVE DATA IN A CONTAINER MANAGEMENT SYSTEM

(71) Applicant: INTERNATIONAL BUSINESS MACHINES CORPORATION, Armonk, NY (US)

(72) Inventors: Qi Feng Huo, Beijing (CN); Da Li Liu, Beijing (CN); Yuan Yuan Wang, Beijing (CN); Lei Li, Beijing (CN); Yan Song Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 18/212,775

(22) Filed: Jun. 22, 2023

(65) Prior Publication Data

US 2024/0427908 A1    Dec. 26, 2024

(51) Int. Cl.
  *G06F 21/60*    (2013.01)
  *G06F 21/33*    (2013.01)
  *G06F 21/62*    (2013.01)

(52) U.S. Cl.
  CPC ............ *G06F 21/602* (2013.01); *G06F 21/33* (2013.01); *G06F 21/6245* (2013.01)

(58) Field of Classification Search
  CPC ..... G06F 21/602; G06F 21/33; G06F 21/6245
  See application file for complete search history.

(56) References Cited

U.S. PATENT DOCUMENTS

| | | | |
|---|---|---|---|
| 2014/0122866 A1* | 5/2014 | Haeger | H04L 63/0471 713/153 |
| 2015/0220745 A1 | 8/2015 | Nellitheertha et al. | |
| 2020/0311288 A1* | 10/2020 | Yankovskiy | G06F 8/60 |
| 2021/0281548 A1 | 9/2021 | Ackerly | |
| 2021/0303734 A1 | 9/2021 | Tsirkin | |
| 2021/0409199 A1 | 12/2021 | Tsirkin | |
| 2023/0032363 A1 | 2/2023 | Huo | |

(Continued)

FOREIGN PATENT DOCUMENTS

WO    2024/260913 A1    12/2024

OTHER PUBLICATIONS

Agent Sidecar Injector, Feb. 8, 2023, Retrieved from Internet: https://developer.hashicorp.com/vault/docs/platform/k8s/injector, 4 pages.

Confidential Containers, Retrieved from Internet: https://github.com/confidential-containers, Feb. 8, 2023, 2 pages.

(Continued)

*Primary Examiner* — Hee K Song

(74) *Attorney, Agent, or Firm* — CHIP LAW GROUP

(57) ABSTRACT

An approach is provided for securing a secret for usage by an application utilizing a client to retrieve secrets. A request is sent from a client in a workload container within a trusted execution environment (TEE) to retrieve an encrypted secret from an application programming interface (API) server outside the TEE. The request is hooked and sent to the API server by a proxy or a secret proxy plugin within the TEE. The secret is received from the API server by the proxy or secret proxy plugin. An agent within the TEE is called to request a private key. The agent obtains the private key. The secret is decrypted by using the private key. The decrypted secret is returned to the client by the proxy or secret proxy plugin, which ensures that a plain text version of sensitive information in the decrypted secret is not accessible outside the TEE.

20 Claims, 7 Drawing Sheets

(56) References Cited

U.S. PATENT DOCUMENTS

2023/0266957 A1* 8/2023 Ren .................... G06F 8/65 717/169
2023/0311288 A1 10/2023 Lubkert et al.

OTHER PUBLICATIONS

Encrypt secrets at the application layer, Retrieved from Internet: https://cloud.google.com/kubernetes-engine/docs/how-to/encrypting-secrets, last updated Feb. 22, 2023, 6 pages.

Encrypting Kubernetes secrets with Key Management Service plug-in, Retrieved from Internet on Mar. 14, 2023: https://www.ibm.com/docs/en/cloud-private/3.1.1?topic=cc-encrypting-kubernetes-secrets-key-management-service-plug-in, 4 pages.

Encrypting Kubernetes Secrets with Sealed Secrets, Dec. 12, 2021, Retrieved from Internet: https://www.sobyte.net/post/2021-12/encrypt-k8s-secrets-with-sealed-secrets/, 6 pages.

Encrypting Secret Data at Rest, last modified Jan. 11, 2023, Retrieved from Internet: https://kubernetes.io/docs/tasks/administer-cluster/encrypt-data/, 4 pages.

GitHub—clstb_ksp, Retrieved from Internet: https://github.com/clstb/ksp, May 2020, 5 pages.

Inject secrets directly into Pods from Vault revisited, Banza Cloud, Retrieved from Internet on Mar. 14, 2023: https://banzaicloud.com/blog/inject-secrets-into-pods-vault-revisited/, 16 pages.

Mac Chaffee, Plain Kubernetes Secrets are fine, Apr. 30, 2022, Retrieved from Internet: https://www.macchaffee.com/blog/2022/k8s-secrets/, 3 pages.

Michael Palacce, SimpleSecrets, Aug. 16, 2022, Retrieved from Internet: https://github.com/Michaelpalacce/SimpleSecrets, 5 pages.

Spiffe, A universal identity control plane for distributed systems, 2023, Retrieved from Internet: https://spiffe.io/, 3 pages.

ISRWO dated Sep. 3, 2024, International application No. PCT/EP2024/066789, International filing Date: Jun. 17, 2024, 13 pages.

* cited by examiner

SECURING SENSITIVE DATA IN A CONTAINER MANAGEMENT SYSTEM

BACKGROUND

The present invention relates to preventing unauthorized access of sensitive information included in a secret, and more particularly to creating and interpreting encrypted data and interpreting authentication certificates to ensure that no component outside a trusted execution environment can access a plain text version of sensitive information in a secret.

Secrets are resource objects used to store sensitive information (e.g., certificates, private keys, tokens, passwords, etc.). Secrets used in applications in a container management system are usually base64 encoded and saved in servers as objects, such as a Secret or ConfigMap object in the Kubernetes® container management system. Kubernetes is a registered trademark of The Linux Foundation located in San Francisco, California. Hereinafter, a Kubernetes® container management system is referred to simply as a Kubernetes® system.

SUMMARY

In one embodiment, the present invention provides a computer system that includes one or more computer processors, one or more computer readable storage media, and computer readable code stored collectively in the one or more computer readable storage media. The computer readable code includes data and instructions to cause the one or more computer processors to perform operations. The operations include sending a request from a client in a workload container within a trusted execution environment (TEE) to retrieve an encrypted secret from an application programming interface (API) server external to the TEE. The operations further include hooking the request and sending the request to the API server by a proxy in a secret sidecar within the TEE or a secret proxy plugin in a service mesh sidecar within the TEE. The operations further include receiving the encrypted secret from the API server by the proxy or the secret proxy plugin. The operations further include calling a software agent within the TEE by a software agent adaptor in the secret sidecar or by the secret proxy plugin to request a private key. The operations further include obtaining, by the software agent, the private key from a key management system. The operations further include decrypting the encrypted secret by using the private key within the secret sidecar or the service mesh sidecar. The operations further include returning the decrypted secret to the client by the proxy or the secret proxy plugin, which ensures that a plain text version of sensitive information in the decrypted secret is not accessible outside of the TEE.

A computer program product and a method corresponding to the above-summarized computer system are also described and claimed herein.

DETAILED DESCRIPTION

Overview

Figure 1:
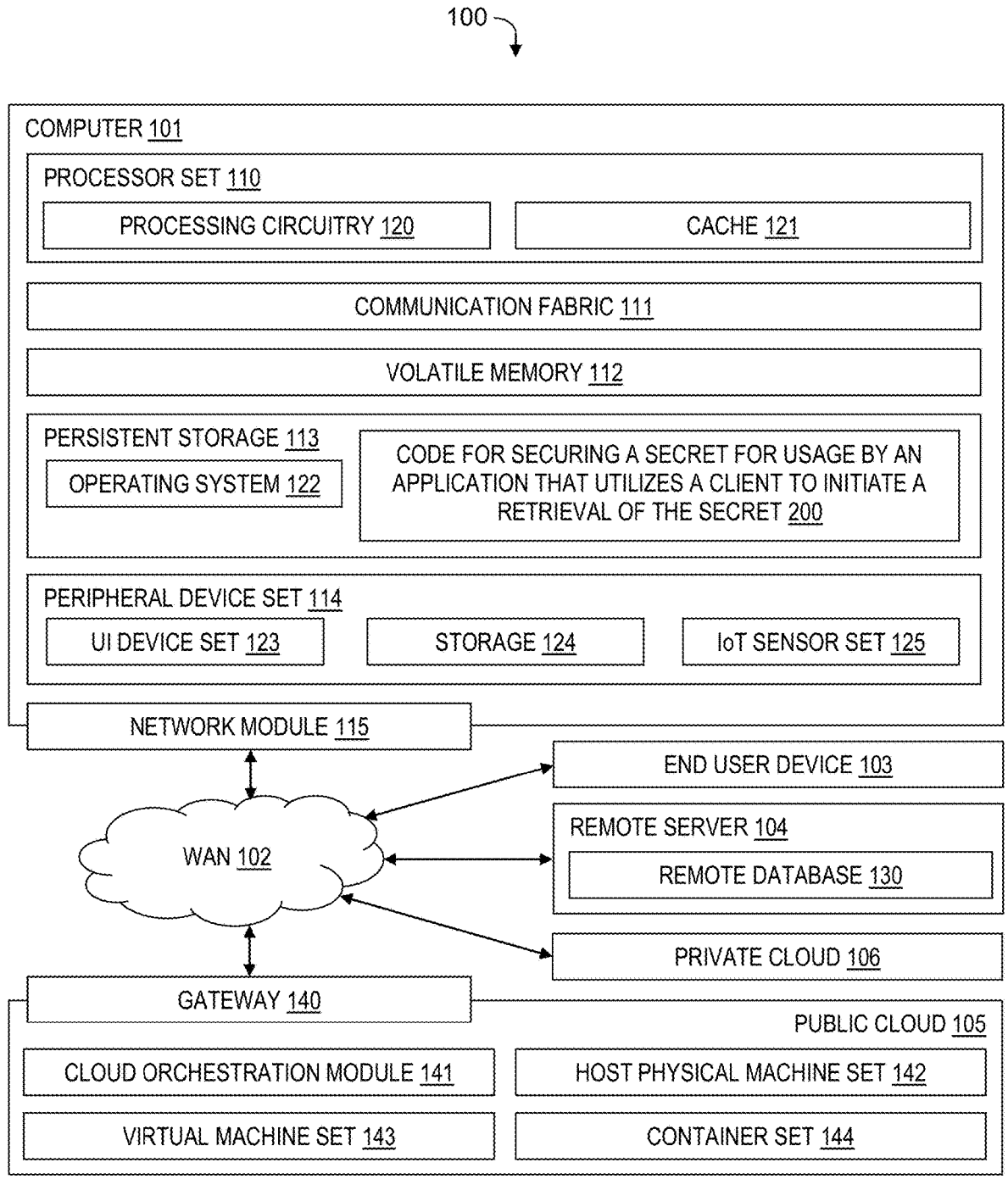
FIG. 1 is a block diagram of a system for securing a secret for usage by an application that utilizes a client to initiate a retrieval of the secret, in accordance with embodiments of the present invention.

Secrets that are used in a container management system and that are base64 encoded and not encrypted are not secure because the secrets can be retrieved by a process or an administrator of the container management system and easily decoded to plain text.

An existing method encrypts a secret before saving the secret in a server, and then decrypts the encrypted secret before using the secret in an application. This method is suitable only for a secret used as a system variable or file mount or is directly retrievable by application code.

The aforementioned existing method does not handle a case in which an application uses an existing client library to communicate with an api-server to retrieve objects that include Secrets and ConfigMap in a Kubernetes® system. In this case, the existing client library does not know that a secret may be encrypted already, which may cause the retrieved secret to not be usable.

Embodiments of the present invention address the aforementioned unique challenges by providing a technique for retrieving and decrypting an encrypted secret before an application uses the secret, where the technique is employed in a case in which the application uses an existing client library to communicate with an application programming interface (API) server (e.g., api-server in a Kubernetes® system) to retrieve the secret. The aforementioned technique disclosed herein ensures that sensitive information in the secret in a cloud native application is protected because the secret can be used only inside a pod within a trusted execution environment (TEE) and a plain text version of sensitive information in the secret is not accessible from the API server or any other component external to the TEE. Furthermore, by using the technique disclosed herein, current applications can use encrypted secrets without any modification being required.

In one embodiment, the aforementioned technique for retrieving and decrypting the encrypted secret before the application uses the secret utilizes a secret proxy plugin in a service mesh sidecar, where the plugin uses private keys obtained by a software agent within a trusted execution environment (TEE) to decrypt the encrypted secret according to configurations and return the decrypted secret to the application container.

In another embodiment, the aforementioned technique utilizes a secret sidecar that employs a proxy, cacher, decoder, and attestation agent adapter and that uses private keys obtained by an attestation agent within a TEE to decrypt and cache the encrypted secret and return the cached and decrypted secret to the application container.

As used herein, a pod is a group of one or more containers in a container management system and a sidecar is a separate container that runs alongside a workload container in a pod.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for securing a secret for usage by an application that utilizes a client to initiate a retrieval of the secret, in accordance with embodiments of the present invention. Computing environment 100 contains an example of an environment for the execution of at least some of the computer code involved in performing the inventive methods, such as code 200 for securing a secret for usage by an application that utilizes a client to initiate a retrieval of the secret. The aforementioned computer code is also referred to herein as computer readable code, computer readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

System and Process for Securing a Secret

Figure 2:
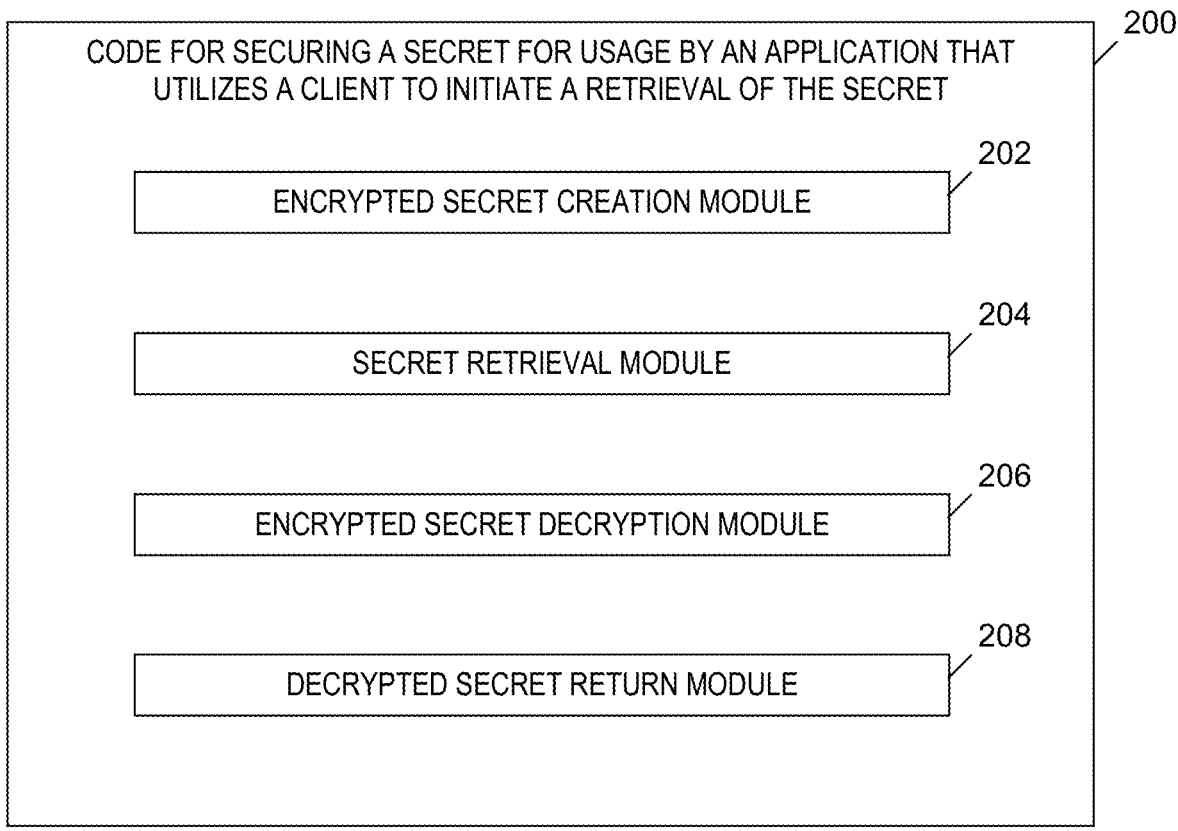
FIG. 2 is a block diagram of modules included in code included in the system of FIG. 1, in accordance with embodiments of the present invention.

FIG. 2 is a block diagram of modules included in code included in the system of FIG. 1, in accordance with embodiments of the present invention. Code 200 includes an encrypted secret creation module 202, a secret retrieval module 204, an encrypted secret decryption module 206, and a decrypted secret return module 208. Encrypted secret creation module 202 is configured to receive a command from a container management system, where the command specifies a public key. Encrypted secret creation module 202 is also configured to create the encrypted secret by executing the received command and using the public key. In one embodiment, encrypted secret creation module 202 is configured to receive a kubectl command that specifies the public key and create the encrypted secret by executing the received kubectl command and using the public key.

Secret retrieval module 204 is configured to send a request from a client of an application (i.e., workload container) within a trusted execution environment (TEE) to retrieve a secret from an application programming interface (API) server external to the TEE. Secret retrieval module 204 is also configured to hook the request to retrieve the secret by a proxy or a secret proxy plugin and send the request to the API server by the proxy or secret proxy plugin. The sending of the request to retrieve the secret by the proxy or secret proxy plugin is performed subsequent to the creation of the encrypted secret by encrypted secret creation module 202. The proxy and secret proxy plugin are described in more detail in the discussions of FIG. 3, FIG. 4, and FIG. 5, which are presented below. Secret retrieval module 204 is also configured to receive, by the proxy or secret proxy plugin, the encrypted secret from the API server, where the encrypted secret is an encrypted version of the secret whose retrieval is requested by the client. The client does not have knowledge that the secret being retrieved is an encrypted secret.

Encrypted secret decryption module 206 is configured to call a software agent within the TEE to request a private key. The software agent is also referred to herein as the attestation agent. Encrypted secret decryption module 206 is also configured to obtain the private key from a key management system (KMS). Encrypted secret decryption module 206 is also configured to decrypt the encrypted secret by using the private key.

In one embodiment, encrypted secret decryption module 206 is configured to call a decoder included in a secret sidecar within the TEE and use the private key to decode the secret and cache the secret in a cacher included in the secret sidecar.

In another embodiment, encrypted secret decryption module 206 is configured to use the private key to decode and cache the secret by a secret proxy plugin included in a service mesh sidecar within the TEE.

Decrypted secret return module 208 is configured to return the decrypted secret or cached secret to the client in the workload container. In combination, modules 202, 204, 206, and 208 secure the secret by ensuring that decryption of the secret occurs only within the TEE and by preventing an access of a plain text version of sensitive information included in the decrypted secret by the API server, which is external to the TEE, or by any other component that is external to the TEE. In one embodiment, modules 202, 204, 206, and 208 collectively prevent a software process and administrators of a Kubernetes® system from accessing or tampering with sensitive information in the secured secret.

The functionality of the modules included in code 200 is further discussed below relative to FIG. 3, FIG. 4, FIG. 5, FIG. 6, and FIG. 7.

Figure 3:
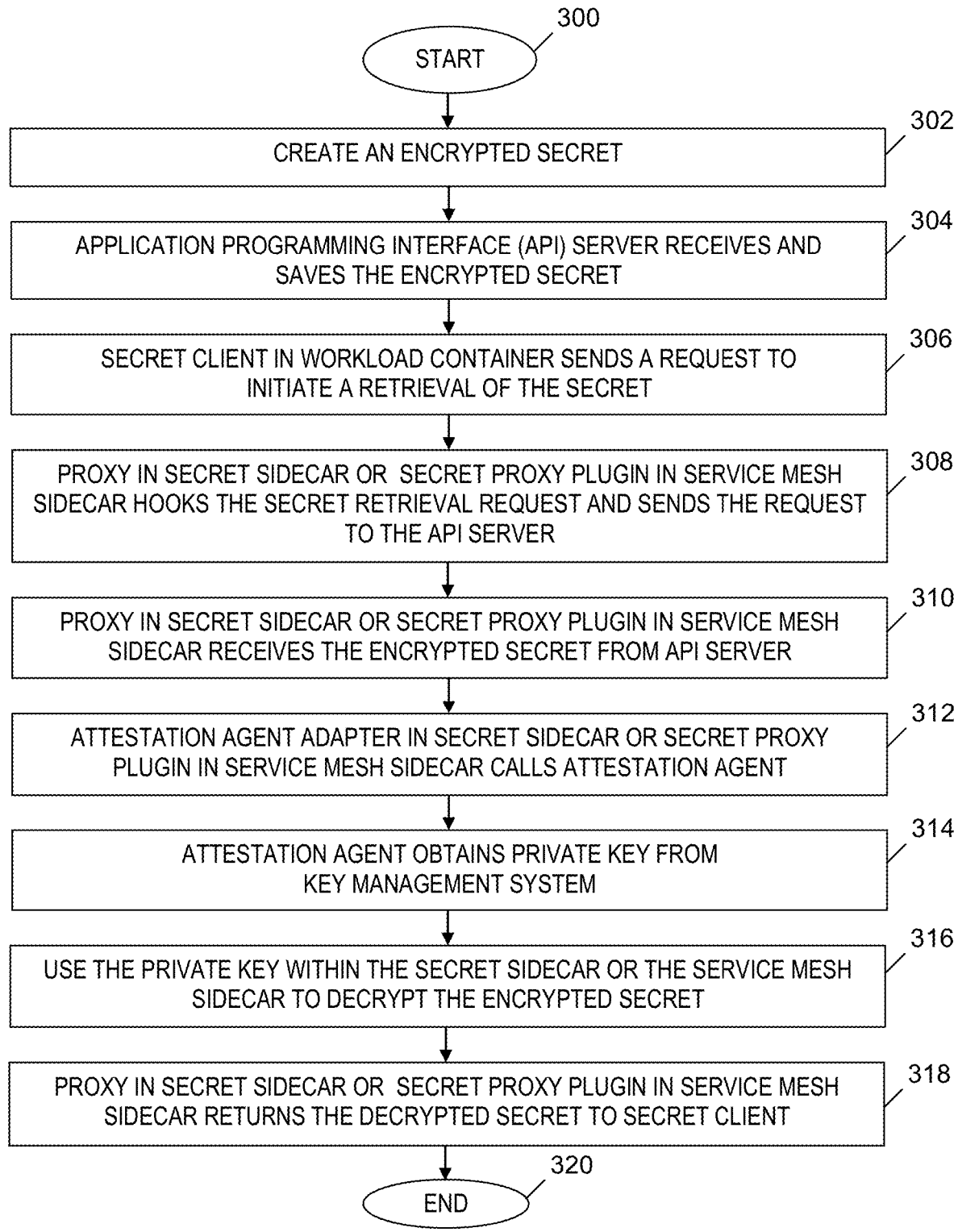
FIG. 3 is a flowchart of a process of securing a secret for usage by an application that utilizes a client to initiate a retrieval of the secret, where operations of the flowchart are performed by the modules in FIG. 2, in accordance with embodiments of the present invention.

FIG. 3 is a flowchart of a process of securing a secret for usage by an application that utilizes a client to initiate a retrieval of the secret, where operations of the flowchart are performed by the modules in FIG. 2, in accordance with embodiments of the present invention. The process of FIG. 3 begins at a start node 300. In step 302, encrypted secret creation module 202 creates an encrypted secret from a secret. In one embodiment, the encrypted secret is created in step 302 via an execution of a kubectl command and a public key, where the kubectl command specifies the public key.

In step 304, an API server receives and saves the encrypted secret in a data store. In one embodiment, step 304 includes the API server saving the encrypted secret in etcd, which is an open source, distributed, and consistent key-value store.

In step 306, a client in a workload container sends a request that initiates a retrieval of the secret. The client mentioned in step 306 is also referred to herein as the secret client. The workload container is included in a pod in a container management system and the pod is included in a guest virtual machine (VM) within a TEE. In one embodiment, the secret client is a secret client in a workload container in a Kubernetes® system.

In step 308, using an execution of code in secret retrieval module 204, a proxy or a secret proxy plugin hooks the request sent in step 306 and sends the request to the API server. In one embodiment, the proxy which performs step 308 resides in a secret sidecar within the aforementioned pod, which is within the guest VM and the TEE. In another embodiment, the secret proxy plugin which performs step 308 resides in a service mesh sidecar within the aforementioned pod.

In step 310, using an execution of code in secret retrieval module 204 and in response to sending the request to the API server in step 308, the API server retrieves the encrypted secret from the data store and sends the encrypted secret to the proxy or the secret proxy plugin and subsequently the proxy or the secret proxy plugin receives the encrypted secret from the API server.

In step 312, using an execution of code in encrypted secret decryption module 206 and in response to the receipt of the encrypted secret in step 310, (i) an attestation agent adaptor in the secret sidecar calls an attestation agent or (ii) the secret proxy plugin in the service mesh sidecar calls the attestation agent. The attestation agent is a software agent which resides and operates within the TEE.

In step 314, using an execution of code in encrypted secret decryption module 206 and in response to the call of the attestation agent in step 312, the attestation agent obtains a private key from a key management system (KMS).

In step 316, using an execution of code in encrypted secret decryption module 206 and using the private key obtained in step 314, (i) a decoder in the secret sidecar decrypts the encrypted secret to generate a decrypted secret and a cacher in the secret sidecar caches the decrypted secret in a cache or (ii) the secret plugin proxy in the service mesh sidecar decrypts the encrypted secret to generate the decrypted secret and caches the decrypted secret in a cache. In one embodiment, the caching is performed in step 316 according to a time-to-live (TTL) value, which specifies an amount of time the secret is stored in the cache before the secret is deleted.

In one embodiment, step 316 includes the proxy calling the decoder in the secret sidecar and in response to calling the decoder, (i) the decoder decoding the encrypted secret by using the private key and (ii) a cacher in the secret sidecar caching the decoded secret in a cache.

In step 318, using an execution of code in decrypted secret return module 208, the proxy or the secret proxy plugin returns the decrypted secret to the secret client. In one embodiment, step 318 includes the proxy or proxy secret plugin returning the cached secret to the secret client. By returning the decrypted or cached secret to the secret client, the process of FIG. 3 completes the retrieval of the secret as requested by the secret client, while preventing the API server or any other component external to the TEE from accessing a decrypted version of the secret.

Following step 318, the process of FIG. 3 ends at an end node 320.

In one embodiment, the process of FIG. 3 further includes (i) the proxy or the secret proxy plugin generating a new proxy certificate file; (ii) injecting an init container into the pod by an admission controller (e.g., an admission controller in a Kubernetes® system); (iii) replacing, by the init container, an original certificate file with the new proxy certificate file in the workload container; (iv) based on the original certificate file being replaced with the new proxy certificate file, communicating between the client and the proxy or between the client and the secret proxy plugin; (v) moving, by the init container, the original certificate file to a new file; and (vi) based on the original certificate file being moved to the new file and by using the new file, communicating between the proxy and the API server or between the secret proxy plugin and the API server.

The process of FIG. 3 secures the secret by ensuring that sensitive information included in the secret can be used only inside the TEE. The process of FIG. 3 prevents the API server or any other component external to the TEE from accessing a plain text version of the sensitive information included in the secret.

Figure 4:
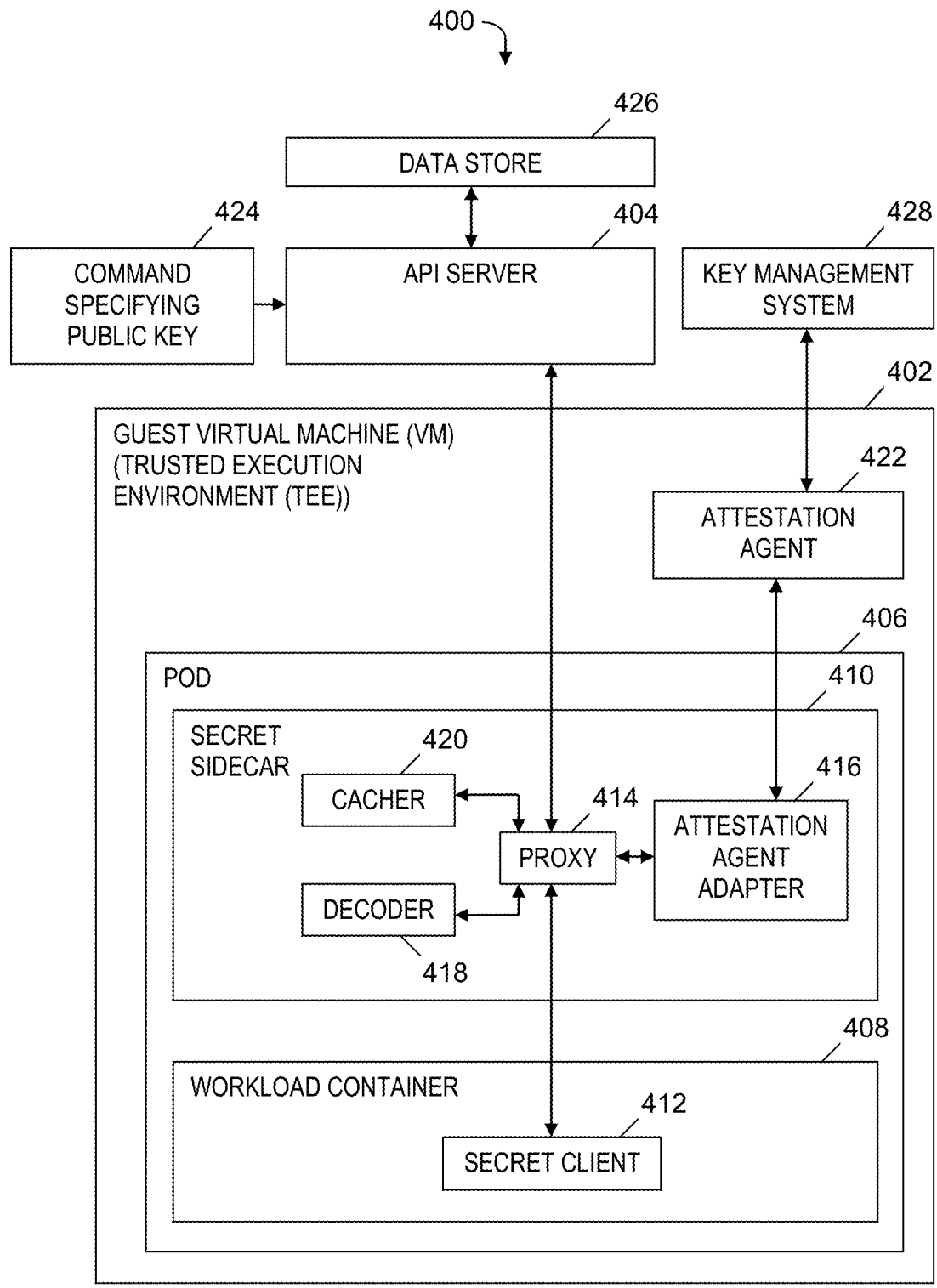
FIG. 4 is a block diagram of a system that implements the process of FIG. 3, where the system does not employ a service mesh, in accordance with embodiments of the present invention.

FIG. 4 is a block diagram of a system 400 that implements the process of FIG. 3, where the system does not employ a service mesh, in accordance with embodiments of the present invention. System 400 includes a guest VM within a TEE 402, an API server 404, and a pod 406, which includes a workload container 408 and a secret sidecar 410. Workload container includes a secret client 412. Secret sidecar 410 includes a proxy 414, an attestation agent adapter 416, a decoder 418, and a cacher 420.

A user creates an encrypted secret via a command specifying a public key 424. In one embodiment, command 424 is a kubectl command specifying a public key. API server 404 receives and saves the encrypted secret in a data store 426. In one embodiment, data store 426 is etcd, the open source, distributed, consistent key-value store in the Kubernetes® system. In one embodiment, the creation of the encrypted secret via the command specifying a public key 424 is included in step 302. In one embodiment, the receipt of the encrypted secret by API server 404 and the saving of the encrypted secret in data store 426 is included in step 304.

Secret client 412 initiates a retrieval of a secret by sending a request to retrieve the secret. In one embodiment, the initiation of the retrieval of the encrypted secret by secret client 412 by sending the request is included in step 306.

Proxy 414 hooks the request to retrieve the secret and sends (i.e., proxies) the request to API server 404. In one embodiment, the hooking and sending of the request by proxy 414 is included in step 308.

In response to sending to API server 404 the request to retrieve the secret, API server 404 receives the request. In response to receiving the request, API server 404 retrieves the encrypted secret from data store 426 and sends the retrieved encrypted secret to proxy 414. Proxy 414 receives the encrypted secret from API server 404. In one embodiment, the receipt of the encrypted secret by proxy 414 is included in step 310.

In response to proxy 414 receiving the encrypted secret, proxy 414 directs attestation agent adapter 416 to call an attestation agent 422 to retrieve a private key from a key management system 428, where the private key can be used to decrypt the encrypted key. Attestation agent 422 is included in the guest VM in TEE 402. Attestation agent adapter 416 calls attestation agent 422 to retrieve the private key, and in response, attestation agent 422 obtains the private key by retrieving the private key from key management system 428 by using an identifier of the guest VM in TEE 402. In one embodiment, the call to attestation agent 422 to retrieve the private key is included in step 312 and the obtaining of the private key by attestation agent 422 is included in step 314.

In response to attestation agent 422 obtaining the private key, proxy 414 calls decoder 418, and in response, decoder 418 decrypts the encrypted secret to generate a decrypted secret by using the private key. In one embodiment, proxy 414 calls cacher 420, and in response, cacher 420 caches the decrypted secret in a cache (not shown), where the caching is specified by a TTL value. In one embodiment, the decrypting of the encrypted secret by decoder 418 is included in step 316.

In response to decoder 418 decrypting the encrypted secret, proxy 414 returns the decrypted secret to secret client 412. In one embodiment, the returning of the decrypted secret to secret client 412 is included in step 318. The return of the decrypted secret to secret client 412 completes the retrieval of the secret as requested by secret client 412, while preventing an access of a plain text version of the sensitive information included in the secret by API server 404 or any other process or component external to the TEE 402.

Figure 5:
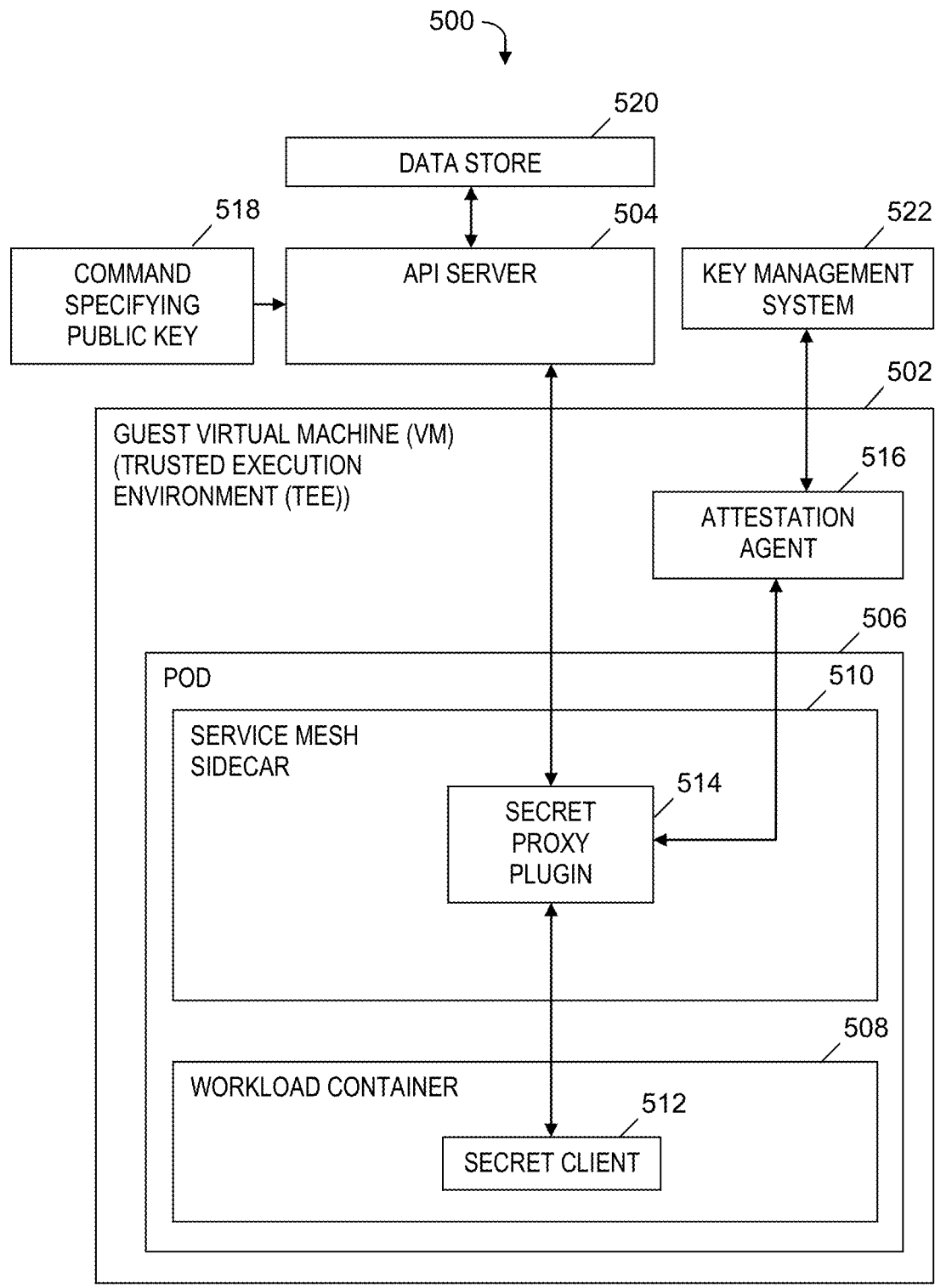
FIG. 5 is a block diagram of a system that implements the process of FIG. 3, where the system employs a service mesh, in accordance with embodiments of the present invention.

FIG. 5 is a block diagram of a system 500 that implements the process of FIG. 3, where the system employs a service mesh, in accordance with embodiments of the present invention. System 500 includes a guest VM within a TEE 502, an API server 504, and a pod 506, which includes a workload container 508 and a service mesh sidecar 510. Workload container includes a secret client 512. Service mesh sidecar 510 includes a secret proxy plugin 514.

A user creates an encrypted secret via a command specifying a public key 518. In one embodiment, command 518 is a kubectl command specifying a public key. API server 504 receives and saves the encrypted secret in a data store 520. In one embodiment, data store 520 is etcd in the Kubernetes® system. In one embodiment, the creation of the encrypted secret via the command specifying a public key 518 is included in step 302. In one embodiment, the receipt of the encrypted secret by API server 504 and the saving of the encrypted secret in data store 520 is included in step 304.

Secret client 512 initiates a retrieval of a secret by sending a request to retrieve the secret. In one embodiment, the initiation of the retrieval of the encrypted secret by secret client 512 by sending the request is included in step 306.

Secret proxy plugin 514 hooks the request to retrieve the secret and sends (i.e., proxies) the request to API server 504. In one embodiment, the hooking and sending of the request by secret proxy plugin 514 is included in step 308.

In response to sending to API server 504 the request to retrieve encrypted secret, API server 504 receives the request. In response to receiving the request, API server 504 retrieves the encrypted secret from data store 520 and sends the retrieved encrypted secret to secret proxy plugin 514. Secret proxy plugin 514 receives the encrypted secret from API server 504. In one embodiment, the receipt of the encrypted secret by secret proxy plugin 514 is included in step 310.

In response to secret proxy plugin 514 receiving the encrypted secret from API server 504, secret proxy plugin 514 calls an attestation agent 516 to retrieve a private key from a key management system 522, where the private key can be used to decrypt the encrypted key. Attestation agent 516 is included in the guest VM in TEE 502. In response to the call by secret proxy plugin 514, attestation agent 516 obtains the private key by retrieving the private key from key management system 522 by using an identifier of the guest VM in TEE 502. In one embodiment, the call to attestation agent 516 to retrieve the private key is included in step 312 and the obtaining of the private key by attestation agent 516 is included in step 314.

In response to attestation agent 516 obtaining the private key, secret proxy plugin 514 decrypts the encrypted secret to generate a decrypted secret. In one embodiment, secret proxy plugin 514 caches the decrypted secret in a cache (not shown), where the caching is specified by a TTL value. In one embodiment, the decrypting of the encrypted secret by secret proxy plugin 514 is included in step 316.

In response to decrypting the encrypted secret, secret proxy plugin 514 returns the decrypted secret to secret client 512. In one embodiment, the returning of the decrypted secret to secret client 512 is included in step 318. The return of the decrypted secret to secret client 512 completes the retrieval of the secret as requested by secret client 512, while preventing an access of a plain text version of the sensitive information included in the secret by API server 504 or any other process or component external to the TEE 502.

Interpreting Authentication Certificates

Figure 6:
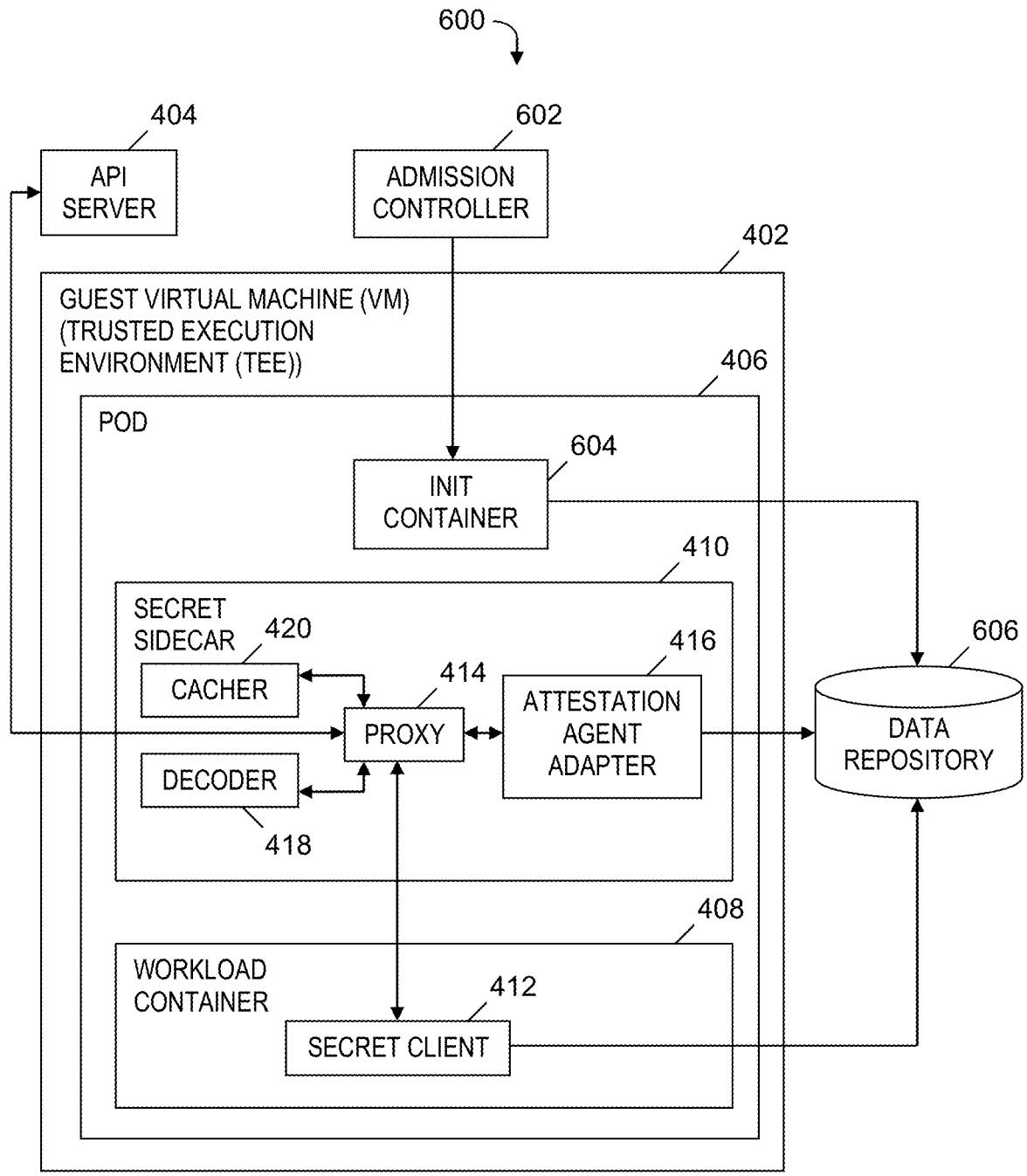
FIG. 6 is a block diagram of a system for interpreting an authentication certificate, where the system employs an admission controller, an init container, and components in the system of FIG. 4, but does not employ a service mesh, in accordance with embodiments of the present invention.

FIG. 6 is a block diagram of a system 600 for interpreting an authentication certificate, where the system employs an admission controller, an init container, and components in the system of FIG. 4, but does not employ a service mesh, in accordance with embodiments of the present invention. System 600 includes guest VM in TEE 402, API server 404, pod 406, workload container 408, secret sidecar 410, secret client 412, proxy 414, attestation agent adapter 416, decoder 418, and cacher 420, which are described above in the discussion relative to FIG. 4.

Interpreting an authentication certificate using system 600 allows proxy 414 to communicate directly with API server 404 instead of using the conventional techniques in which a secret client communicates directly with an API server. Interpreting an authentication certificate using system 600 includes the following steps:

1. An admission controller 602 in a Kubernetes® system injects (i.e., adds) an init container 604 into pod 406.
2. Init container 604 mounts the/var/run/secrets folder in a data repository 606.
3. Init container 604 copies an authentication certificate in the file: /var/run/secrets/kubernetes.io/serviceaccount/ca.crt to the file: /var/run/secrets/kubernetes.io/serviceaccount/ca_api_server.crt in data repository 606.
4. Init container 604 copies a proxy certificate file (i.e., a certificate file of proxy 414) to/var/run/secrets/kubernetes.io/serviceaccount/ca.crt in data repository 606.
5. Secret client 412 mounts and uses the authentication certificate in the file: /var/run/secrets/kubernetes.io/serviceaccount/ca_api_server.crt to authenticate proxy 414, so that secret client 412 successfully communicates with proxy 414.
6. Proxy 414 mounts and uses the authentication certificate in the file: /var/run/secrets/kubernetes.io/serviceaccount/ca.crt to authenticate API server 404, so that proxy 414 successfully communicates with API server 404.

In one embodiment, proxy 414 generates a new proxy certificate file and init container 604 replaces the authentication certificate file: /var/run/secrets/kubernetes.io/serviceaccount/ca.crt with the new proxy certificate file in workload container 408, so that secret client 412 can communicate with proxy 414. Proxy 414 moves the original/var/run/secrets/kubernetes.io/serviceaccount/ca.crt file to a new file and proxy 414 uses the moved file to communicate with API server 404.

Figure 7:
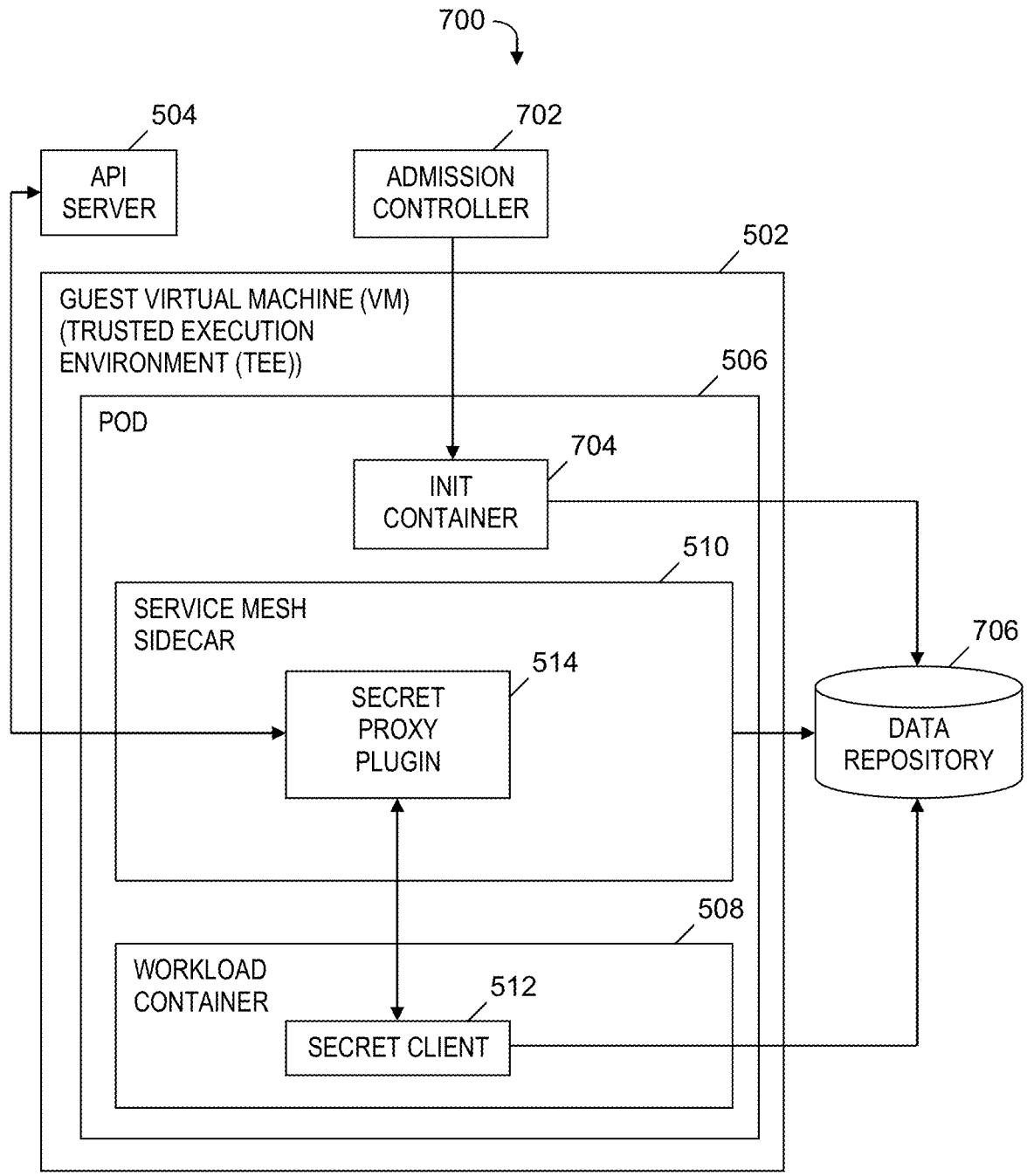
FIG. 7 is a block diagram of a system for interpreting an authentication certificate, where the system employs an admission controller, an init container, components of the system of FIG. 5, and a service mesh, in accordance with embodiments of the present invention.

FIG. 7 is a block diagram of a system 700 for interpreting an authentication certificate, where the system employs an admission controller, an init container, components of the system of FIG. 5, and a service mesh, in accordance with embodiments of the present invention. System 700 includes guest VM in TEE 502, API server 504, pod 506, workload container 508, service mesh sidecar 510, secret client 512, and secret proxy plugin 514, which are described above in the discussion relative to FIG. 5.

Interpreting an authentication certificate using system 700 allows secret proxy plugin 514 to communicate directly with API server 504 instead of using the conventional techniques in which a secret client communicates directly with an API server. Interpreting an authentication certificate using system 700 includes the following steps:

1. An admission controller 702 in a Kubernetes® system injects an init container 704 into pod 506.
2. Init container 704 mounts the/var/run/secrets folder in a data repository 706.
3. Init container 704 copies an authentication certificate in the file: /var/run/secrets/kubernetes.io/serviceaccount/ca.crt to the file: /var/run/secrets/kubernetes.io/serviceaccount/ca_api_server.crt in data repository 706.
4. Init container 704 copies a secret proxy plugin certificate file (i.e., a certificate file of secret proxy plugin 514) to/var/run/secrets/kubernetes.io/serviceaccount/ca.crt. in data repository 706.
5. Secret client 512 mounts and uses the authentication certificate in the file: /var/run/secrets/kubernetes.io/serviceaccount/ca_api_server.crt to authenticate secret proxy plugin 514, so that secret client 512 successfully communicates with secret proxy plugin 514.
6. Secret proxy plugin 514 mounts and uses the authentication certificate in the file: /var/run/secrets/kubernetes.io/serviceaccount/ca.crt to authenticate API server 504, so that secret proxy plugin 514 successfully communicates with API server 504.

The descriptions of the various embodiments of the present invention have been presented herein for purposes of illustration but are not intended to be exhaustive or limited to the embodiments disclosed. Many modifications and variations will be apparent to those skilled in the art. Accordingly, the appended claims are intended to encompass all such modifications and variations as fall within the true spirit and scope of the embodiments described herein.

What is claimed is:

1. A computer system comprising:
one or more computer processors;
one or more computer readable storage media; and
computer readable code stored collectively in the one or more computer readable storage media, with the computer readable code including data and instructions to cause the one or more computer processors to perform at least the following operations:
sending a request from a client in a workload container within a trusted execution environment (TEE) to retrieve a secret from an application programming interface (API) server external to the TEE;
hooking the request and sending the request to the API server by a proxy in a secret sidecar within the TEE or a secret proxy plugin in a service mesh sidecar within the TEE;
receiving the encrypted secret from the API server by the proxy or the secret proxy plugin;
calling a software agent within the TEE by a software agent adaptor in the secret sidecar or by the secret proxy plugin to request a private key;
obtaining, by the software agent, the private key from a key management system;
decrypting the encrypted secret by using the private key within the secret sidecar or the service mesh sidecar; and
returning the decrypted secret to the client by the proxy or the secret proxy plugin, which ensures that a plain text version of sensitive information in the decrypted secret is not accessible outside of the TEE.

2. The computer system of claim 1, wherein the computer readable code including the data and the instructions causes the one or more computer processors to perform the following further operations:
receiving a kubectl command that specifies a public key; and
creating the encrypted secret by executing the received kubectl command and using the public key, wherein the sending the request to retrieve the secret is performed subsequent to the creating the encrypted secret.

3. The computer system of claim 1, wherein the computer readable code including the data and the instructions causes the one or more computer processors to perform the following further operation:
generating a new proxy certificate file by the proxy or the secret proxy plugin.

4. The computer system of claim 3, wherein the computer readable code including the data and the instructions causes the one or more computer processors to perform the following further operation:
injecting an init container into a pod by an admission controller, wherein the pod includes (i) the workload container, (ii) the client, and (iii) the proxy or the secret proxy plugin, and wherein the pod is included in the TEE.

5. The computer system of claim 4, wherein the computer readable code including the data and the instructions causes the one or more computer processors to perform the following further operations:
replacing, by the init container, an original certificate file with the new proxy certificate file in the workload container; and
based on the original certificate file being replaced with the new proxy certificate file, communicating between the client and (i) the proxy or (ii) the secret proxy plugin.

6. The computer system of claim 5, wherein the computer readable code including the data and the instructions causes the one or more computer processors to perform the following further operations:
moving, by the init container, the original certificate file to a new file; and
based on the original certificate file being moved to the new file, communicating between the (i) the proxy and the API server or (ii) the secret proxy plugin and the API server by using the new file.

7. The computer system of claim 1, wherein the computer readable code including the data and the instructions causes the one or more computer processors to perform the following further operations:
calling, by the proxy, a decoder in the secret sidecar; and
in response to the calling the decoder, decoding the encrypted secret by using the private key and caching the decoded secret by a cacher in the secret sidecar, wherein returning the decrypted secret to the client by the proxy includes returning the cached secret to the client.

8. A computer program product comprising:
one or more computer readable storage media having computer readable program code collectively stored on the one or more computer readable storage media, the computer readable program code being executed by one or more processors of a computer system to cause the computer system to perform at least the following operations:
sending a request from a client in a workload container within a trusted execution environment (TEE) to retrieve an encrypted secret from an application programming interface (API) server external to the TEE;
hooking the request and sending the request to the API server by a proxy in a secret sidecar within the TEE or a secret proxy plugin in a service mesh sidecar within the TEE;
receiving the encrypted secret from the API server by the proxy or the secret proxy plugin;
calling a software agent within the TEE by a software agent adaptor in the secret sidecar or by the secret proxy plugin to request a private key;
obtaining, by the software agent, the private key from a key management system;
decrypting the encrypted secret by using the private key within the secret sidecar or the service mesh sidecar; and
returning the decrypted secret to the client by the proxy or the secret proxy plugin, which ensures that a plain text version of sensitive information in the decrypted secret is not accessible outside of the TEE.

9. The computer program product of claim 8, wherein the computer readable program code being executed by the one or more processors of the computer system causes the computer system to perform the following further operations:
receiving a kubectl command that specifies a public key; and
creating the encrypted secret by executing the received kubectl command and using the public key, wherein the sending the request to retrieve the secret is performed subsequent to the creating the encrypted secret.

10. The computer program product of claim 8, wherein the computer readable program code being executed by the one or more processors of the computer system causes the computer system to perform the following further operation:
generating a new proxy certificate file by the proxy or the secret proxy plugin.

11. The computer program product of claim 10, wherein the computer readable program code being executed by the one or more processors of the computer system causes the computer system to perform the following further operation:
injecting an init container into a pod by an admission controller, wherein the pod includes (i) the workload container, (ii) the client, and (iii) the proxy or the secret proxy plugin, and wherein the pod is included in the TEE.

12. The computer program product of claim 11, wherein the computer readable program code being executed by the one or more processors of the computer system causes the computer system to perform the following further operations:
replacing, by the init container, an original certificate file with the new proxy certificate file in the workload container; and
based on the original certificate file being replaced with the new proxy certificate file, communicating between the client and (i) the proxy or (ii) the secret proxy plugin.

13. The computer program product of claim 12, wherein the computer readable program code being executed by the one or more processors of the computer system causes the computer system to perform the following further operations:
moving, by the init container, the original certificate file to a new file; and
based on the original certificate file being moved to the new file, communicating between the (i) the proxy and the API server or (ii) the secret proxy plugin and the API server by using the new file.

14. The computer program product of claim 8, wherein the computer readable program code being executed by the one or more processors of the computer system causes the computer system to perform the following further operations:
calling, by the proxy, a decoder in the secret sidecar; and
in response to the calling the decoder, decoding the encrypted secret by using the private key and caching the decoded secret in a cacher in the secret sidecar, wherein returning the decrypted secret to the client by the proxy includes returning the cached secret to the client.

15. A computer-implemented method comprising:
sending, by one or more processors, a request from a client in a workload container within a trusted execution environment (TEE) to retrieve an encrypted secret from an application programming interface (API) server external to the TEE;
hooking, by the one or more processors, the request and sending, by the one or more processors, the request to the API server, the hooking and the sending being performed by a proxy in a secret sidecar within the TEE or a secret proxy plugin in a service mesh sidecar within the TEE;
receiving, by the one or more processors, the encrypted secret from the API server;
calling, by the one or more processors, a software agent within the TEE to request a private key;
obtaining, by the one or more processors, the private key from a key management system;
decrypting, by the one or more processors, the encrypted secret by using the private key within the secret sidecar or the service mesh sidecar; and
returning, by the one or more processors, the decrypted secret to the client by the proxy or the secret proxy plugin, which ensures that a plain text version of sensitive information in the decrypted secret is not accessible outside of the TEE.

16. The method of claim 15, further comprising:
receiving, by the one or more processors, a kubectl command that specifies a public key; and
creating, by the one or more processors, the encrypted secret by executing the received kubectl command and using the public key, wherein the sending the request to retrieve the secret is performed subsequent to the creating the encrypted secret.

17. The method of claim 15, further comprising:
generating, by the one or more processors, a new proxy certificate.

18. The method of claim 17, further comprising:
injecting, by the one or more processors, an init container into a pod by an admission controller, wherein the pod includes (i) the workload container, (ii) the client, and (iii) the proxy or the secret proxy plugin, and wherein the pod is included in the TEE.

19. The method of claim 18, further comprising:

replacing, by the one or more processors, an original certificate file with the new proxy certificate file in the workload container, wherein the replacing is performed by the init container; and based on the original certificate file being replaced with the new proxy certificate file, communicating, by the one or more processors, between the client and (i) the proxy or (ii) the secret proxy plugin.

20. The method of claim 19, further comprising:

moving, by the one or more processors, the original certificate file to a new file, wherein the moving is performed by the init container; and based on the original certificate file being moved to the new file, communicating, by the one or more processors, between the (i) the proxy and the API server or (ii) the secret proxy plugin and the API server by using the new file.

* * * * *